Nov. 6, 1923.                                    1,473,232
                J. HOPKINSON
                COUNTING SCALE
            Filed Nov. 24, 1920          4 Sheets-Sheet 1

Joseph Hopkinson
                                          INVENTOR

Nov. 6, 1923.
J. HOPKINSON
1,473,232
COUNTING SCALE
Filed Nov. 24, 1920
4 Sheets-Sheet 2
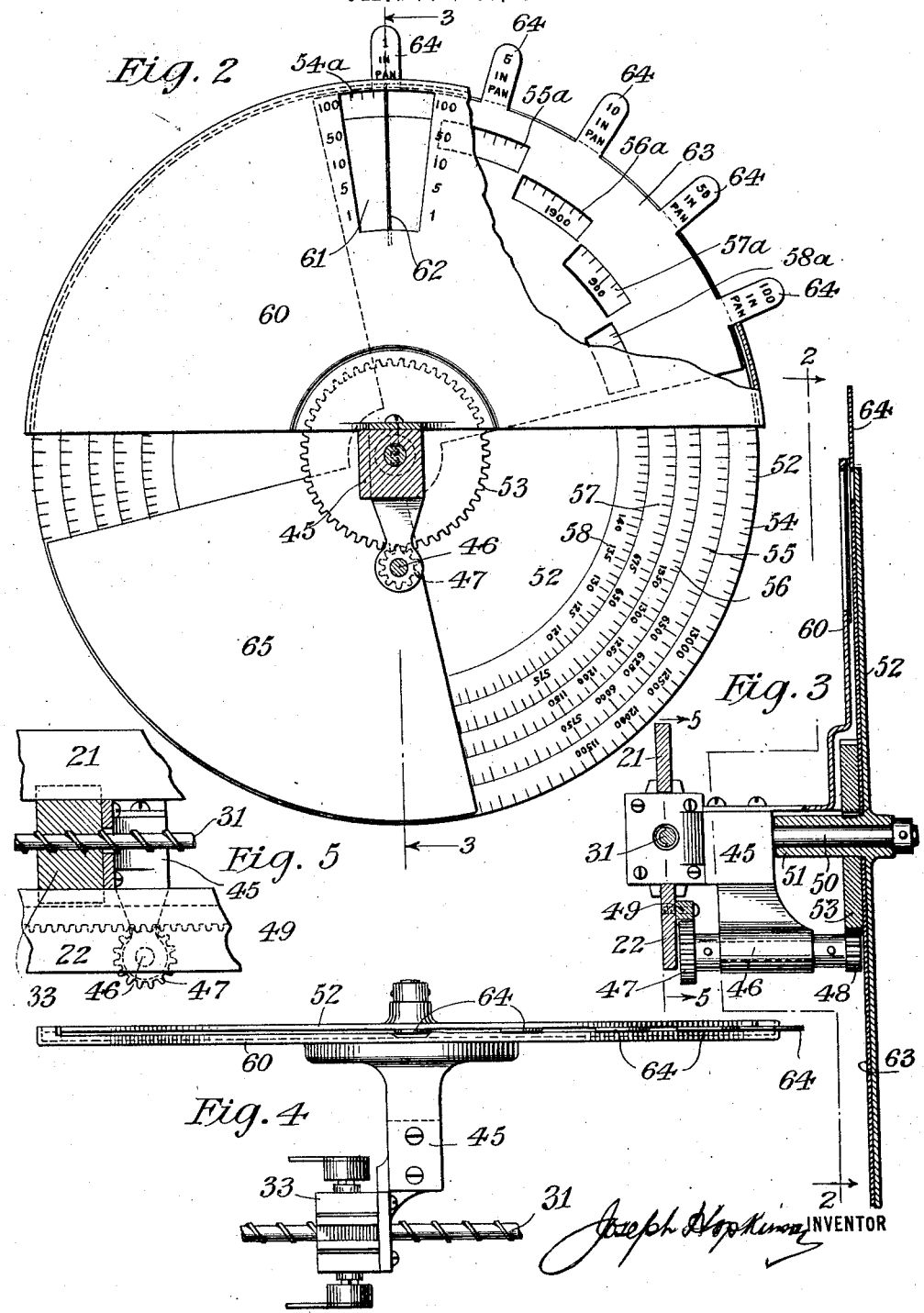
Joseph Hopkinson INVENTOR Nov. 6, 1923.　　　　　　　　　　　　　　　　1,473,232
J. HOPKINSON
COUNTING SCALE
Filed Nov. 24, 1920　　　4 Sheets-Sheet 3
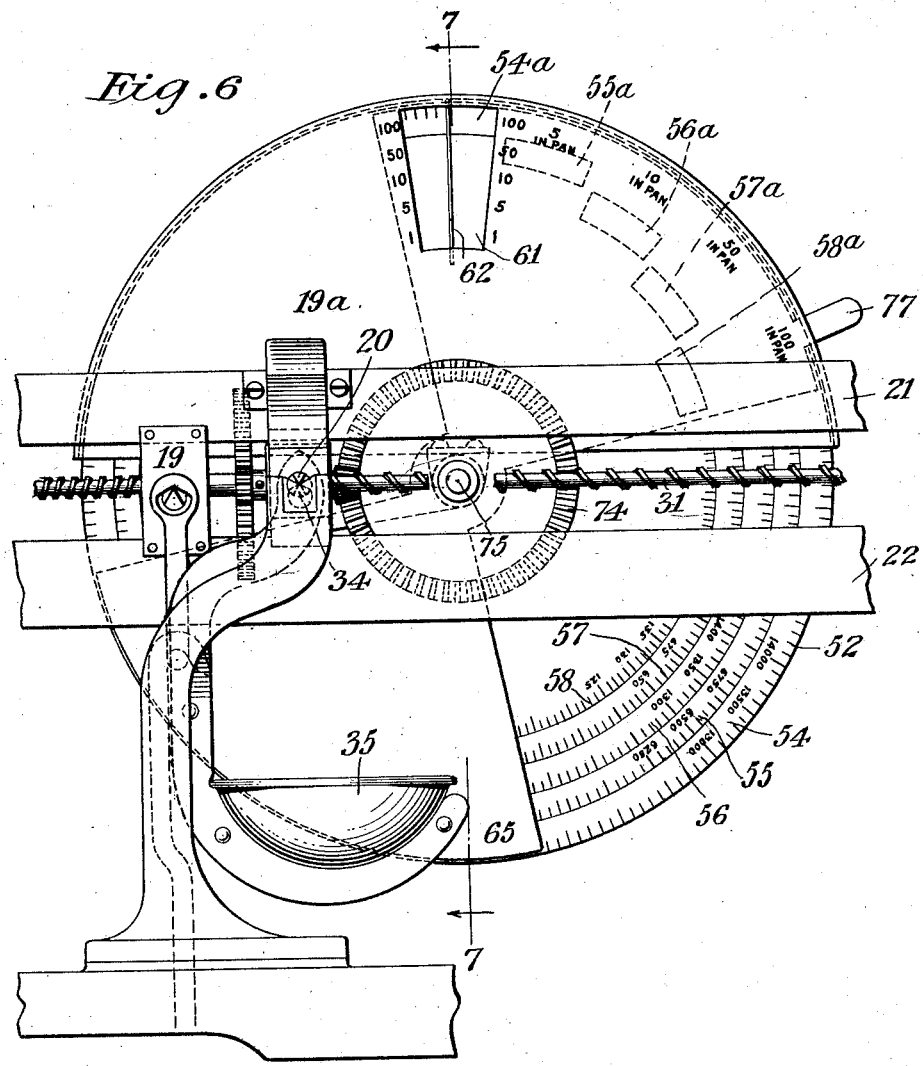
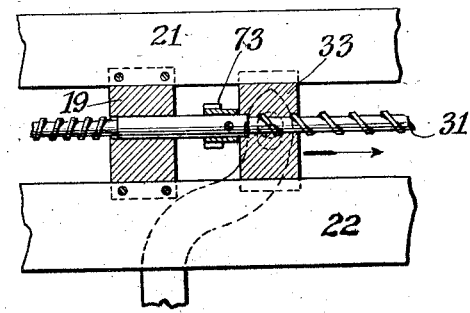
Joseph Hopkinson
INVENTOR Nov. 6, 1923.

J. HOPKINSON

COUNTING SCALE

Filed Nov. 24, 1920

Joseph Hopkinson
INVENTOR

Patented Nov. 6, 1923.

1,473,232

UNITED STATES PATENT OFFICE.

JOSEPH HOPKINSON, OF DAYTON, OHIO, ASSIGNOR, BY MESNE ASSIGNMENTS, TO DAYTON SCALE COMPANY, OF DAYTON, OHIO, A CORPORATION OF NEW JERSEY.

COUNTING SCALE.

Application filed November 24, 1920. Serial No. 426,212.

*To all whom it may concern:*

Be it known that I, JOSEPH HOPKINSON, a citizen of the United States of America, residing at Dayton, Montgomery County, and State of Ohio, have invented certain new and useful Improvements in Counting Scales, of which the following is a full, clear, and exact description.

This invention relates to improvements in counting scales of the type shown and described in Hopkinson Patent No. 1,110,262. In the use of the counting scale shown in the patent above mentioned count readings are taken from a beam graduated with a plurality of graduations. While satisfactory results are usually secured with this method of reading if proper care is taken, it has been found objectionable in some instances. If the aggregate count of the articles weighed is large it becomes necessary to space the graduations upon the beam very closely together or to excessively lengthen the beam as either practice is open to objection, the fine graduations being difficult to read and interpolate properly and the lengthening of beams being objectionable on account of the increase in over-all width of the scale.

The present invention has for its objects the provision of a count displaying device or unit of such character that fine graduations are avoided and at the same time the scale beams may be kept within desired dimensions. The capacity may also be materially increased over present constructions.

Other objects reside in the provision of a count displaying device which will permit numerical readings to be taken without the possible confusion arising from taking readings from a graduated scale having a variable numerical value.

A further object of the present invention resides in the provision of a so-called direct reading device which may be readily attached to scales of the type shown in the Hopkinson patent heretofore referred to.

Other objects reside in the provision of a device which will be simple to use and manufacture and one which will not get out of order when in use.

In the drawings:

Fig. 1 is a side elevation of a weighing machine embodying the counting attachment.

Fig. 2 is an enlarged detail view of the counting disc. This is a sectional view taken on line 2—2 of Fig. 3. Certain parts are broken away to show the interior construction.

Fig. 3 is a detail sectional view taken on line 3—3 of Fig. 2.

Fig. 4 is a detail top plan view of the parts shown in Figs. 2 and 3.

Fig. 5 is a detail sectional view taken on line 5—5 of Fig. 3.

Fig. 6 is a side elevation of a modified type of disc counting attachment. The drive to this disc comprises bevel gearing instead of the spur gearing employed with the construction illustrated in Figs. 2 to 5 inclusive.

Fig. 8 is a detail sectional view taken on line 8—8 of Fig. 7.

Figure 1:
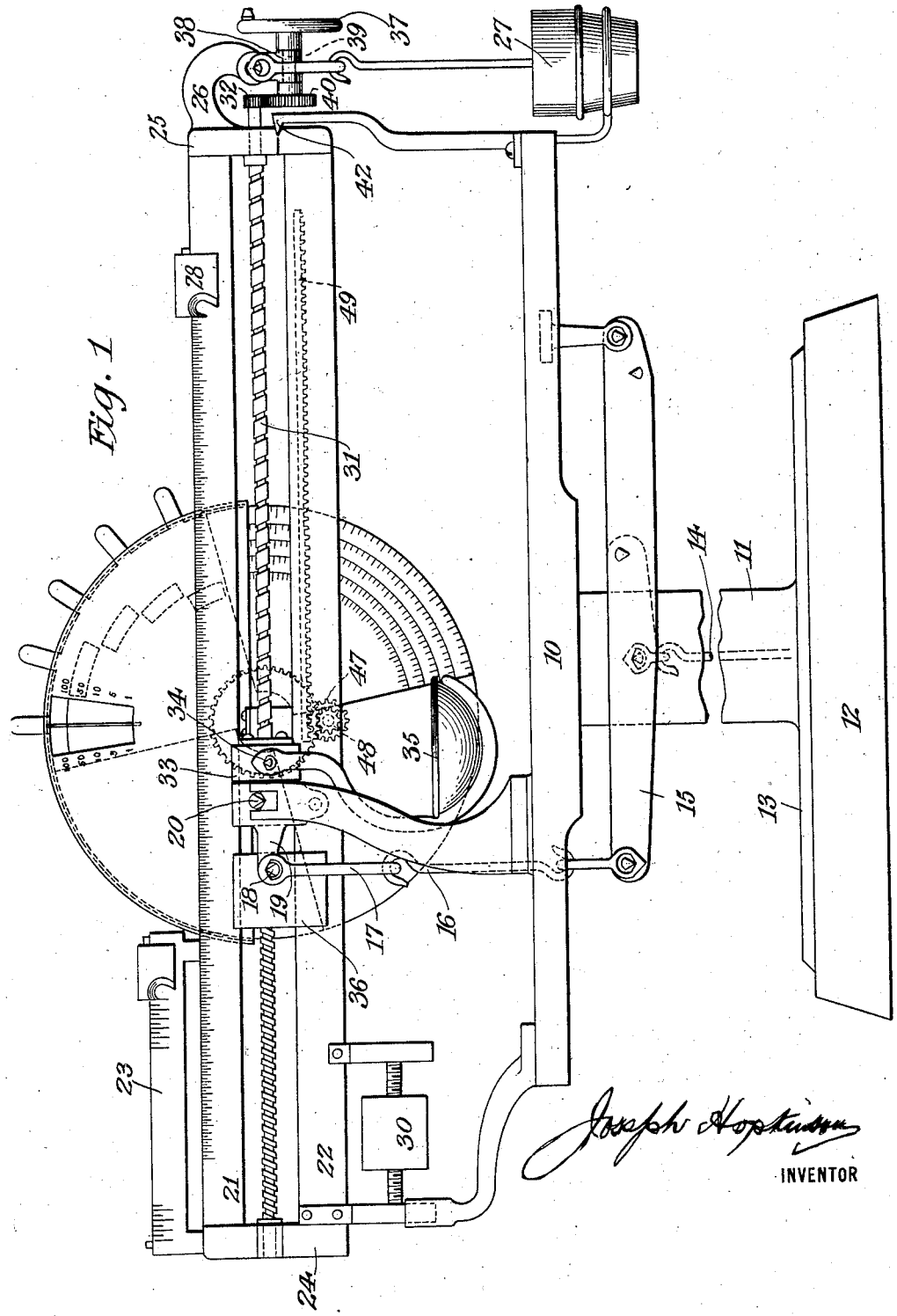

As shown in the accompanying drawings the machine embodies a head 10 supported upon a standard 11 from a base 12. Upon the base there is supported, through the usual base lever system a platform 13 and extending upwardly from the base lever system is a steelyard 14 which connects with an intermediate lever 15 suspended at one end from the head 10 and at the other end connected through link 16 and loop 17 with knife edges 18 carried by a beam yoke 19. The beam yoke is also provided with knife edges 20 which rest in bearings carried in brackets extending upwardly from head 10. The scale beam which is rigid with yoke 19 includes top and bottom bars 21 and 22 and tare bar 23. Bars 21 and 22 extend in opposite directions from the fulcrum knife edges 20 and at their ends are connected by pieces 24 and 25. 25 has fastened to it a goose neck 26 from which the counterpoise cup 27 is suspended in the usual manner.

The bar 21 is graduated in the usual manner with pound and ounce graduations and is provided with a sliding poise 28. The tare beam 23 is likewise provided with a poise and the beam assembly is likewise provided with a balance weight 30.

Journaled in the beam, preferably between the upper and lower bars 21, 22 is a screw-threaded shaft 31 having one end extended beyond part 25 and provided with a pinion 32. The ends of the shaft 31 upon opposite sides of the beam fulcrum are provided with screw-threads of opposite inclination. The threads to the right as shown in Fig. 1 are preferably provided with a long pitch and those to the left with a short pitch.

Cooperating with the threaded shaft to the right of the fulcrum is a carriage 33 provided with knife edges 34 from which is suspended a counterweight receiver 35. The threaded shaft to the left of the beam fulcrum carries a poise 36 which is adapted to move to the left as the counter-weight receiver moves to the right, and counterbalance the weight of the same when empty. These movements are effected by rotating the shaft in a manner to be hereafter described. The counterweight receiver being in itself counterbalanced irrespective of position, the weight of articles therein will alone load the beam and may be used to counterbalance the load upon the platform 10. With the load thus counterbalanced the displacement of the carriage and counterweight receiver may be used as a measure of the count of articles upon the platform if the leverage ratio of the machine and the number of articles in the receiver are taken into consideration. It therefore follows that if the rotational movement of the threaded shaft be counted, and due allowance be made for the leverage ratio and the number of articles in the receiver, the revolution count will correspond to the count of the articles upon the platform.

In order to rotate the threaded shaft I provide a hand wheel 37 fixed to a stub shaft suitably journaled in an extension 38 from goose neck 26. The stub shaft 39 carries a pinion 40 which meshes with pinion 32 and thereby rotates the threaded shaft upon rotation of the hand wheel.

The balance of the scale beam is determined by means of a pointer 42 fixed to the frame 10 and cooperating with a line ruled on cross member 25 as shown in Fig. 1.

Fixed to the carriage 33 which is slidable relatively to the beams 21 and 22 is a bracket 45 which extends rearwardly from the beams and which has a depending portion forming a journal for a short shaft 46. Fixed to this shaft are two pinions 47 and 48. The former meshes with a rack 49 which is fixed to beam 22 (see Figs. 3 and 5). Fixed in the bracket 45 is a long stud 50 which supports a sleeve 51 carrying a disc 52. Rigidly fixed to the sleeve is a gear 53. It will be understood that the displacement of the carriage 33 is proportional to the count when the beams are in balance. Displacement of the carriage causes pinion 47 to be rotated (by reason of fixed rack 49). This rotational movement is imparted through shaft 46, gears 48 and 53 to the disc 52. In this manner the disc is rotated in proportion to the count. Inasmuch as varying numbers of articles are placed in the receiver varying graduations must be placed upon the face of disc 52. These rows of graduations are shown at 54, 55, 56, 57 and 58 in Fig. 2 and are graduated to correspond to the count when 100, 50, 10, 5 and 1 articles are placed in the receiver.

Inasmuch as confusion might result if the improper row of graduations be read, I provide means for selectively rendering visible the particular row corresponding to the number of articles which are placed in the receiver.

Fixed over the front of the disc 52 and carried by bracket 45 is a fixed shield 60 having a window aperture 61 of depth sufficient to permit the reading of any of the rows of graduations. Across this window aperture is fixed a suitable reading wire 62.

Rotatably mounted in front of the disc 52 is a shutter 63 having a plurality of staggered windows $54^a, 55^a, 56^a, 57^a$ and $58^a$; these windows being aligned with the corresponding rows of graduations on disc 52. The shutter is also provided with a plurality of projecting tabs 64 which carry indicating characters indicating the number of articles to be placed in the receiver or pan when a particular shutter window is aligned with the main window 61. By grasping the desired tab and rotating the shutter any desired shutter window may be aligned with the main window thereby exposing the desired row of graduations. The shutter is retained in displaced position by the tab springing into a depression in the periphery of shield 60 as shown in Fig. 4.

To counterbalance the shutter the same is extended beyond the point of support upon sleeve 51 as best shown at 65 in Fig. 2. I also provide supplementary indicating characters at each side of the window 61 to show the number of counterbalancing articles corresponding to each row of graduations.

Figure 7:
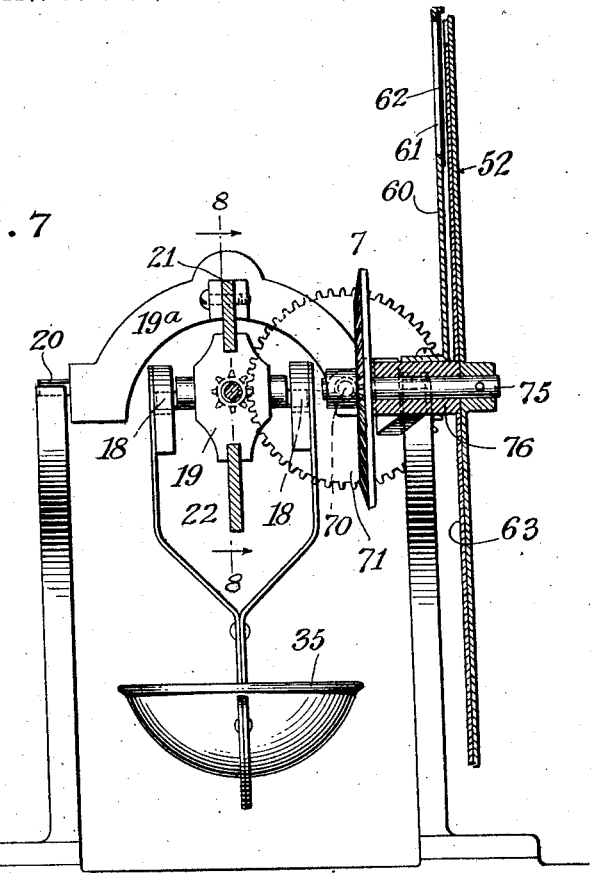
Fig. 7 is a part sectional view taken on line 7—7 of Fig. 6.
Figure 9:
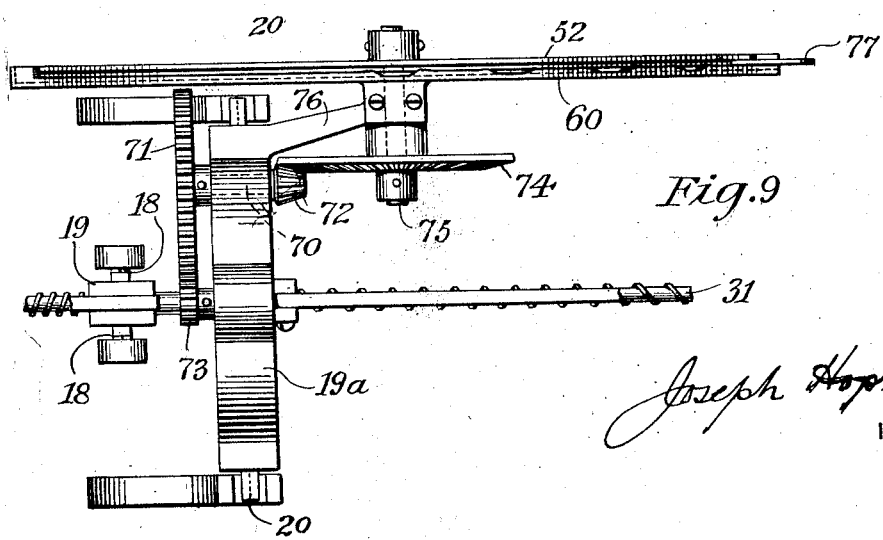
Fig. 9 is a top plan view of the parts shown in Fig. 6.

The construction illustrated in Figs. 6 to 9 inclusive is similar in respect to the indicating features and arrangement of shutters. However, the indicating device does not shift in position relatively to the scale beams. The carriage 33 slides as before and the beam yoke corresponding to yoke 19 in the previously described construction is made in two parts; one part $19^a$ straddles the carriage as shown in Figs. 7 and 9 and carries the knife edges 20. This straddling yoke is attached to the upper beam 21 as shown in Fig. 7. Yoke 19 is connected to both beams and carries knife edges 18. Journaled in the yoke $19^a$ is a shaft 70 carrying at its ends gear 71 and bevel pinion 72. Gear 71 meshes with and is driven by pinion 73 which is fixed to the threaded shaft 31 (see Fig. 9). Bevel pinion 72 drives a beveled ring gear 74 which is fixed to a shaft 75. This shaft carries the indicating disc 52 and is itself mounted in a bracket 76 extending from the yoke 19a. The bracket 76 forms a support for the fixed housing 60 and for the rotatable shutter 63.

A series of multiple tabs may be provided for shifting the shutter as in the previous construction or a single tab can be provided, such as 77, which may be brought into registry with notches in the shield (see Fig. 9). Where the single tab is utilized the front of the fixed shield would be provided with suitable designating characters at points over the notches as shown in Fig. 6.

The operation is the same as before, excepting that the dial and shield devices do not shift transversely upon the beam.

What I claim is:—

1. A count indicating attachment for a counting scale having a counting beam, a counterpoise receiver and a counterbalancing poise thereon, and a threaded shaft for displacing the said receiver and poise relatively to the fulcrum of said beam, said attachment comprising in combination a rotary dial having a plurality of rows of count graduations, gearing associated with the dial for rotating the same upon rotation of the threaded shaft and proportionally to the extent of rotation thereof, a fixed shield over the said dial, and a window therein, through which the count graduation may be read.

2. A count indicating attachment for a counting scale having a counting beam, a counterpoise receiver and a counterbalancing poise thereon, and a threaded shaft for displacing the said receiver and poise relatively to the fulcrum of said beam, said attachment comprising in combination a rotary dial having a plurality of rows of count graduations, gearing associated with dial for rotating the same upon rotation of the shaft, said rotational movement of the dial being proportional to the count of the articles counterbalanced by the articles in the receiver, and means for selectively controlling the visibility of the different rows of count graduations upon the dial.

3. A count indicating attachment for a counting scale having a counting beam, a counterpoise receiver and a counterbalancing poise thereon, and a threaded shaft for displacing the said receiver and poise relatively to the fulcrum of said beam, said attachment comprising in combination a rotary dial having a plurality of rows of count graduations, gearing associated with the dial for rotating the same upon rotation of the threaded shaft, a fixed shield over the said dial, a window therein, and means comprising an apertured shutter for exposing to view one set of the graduations and for obscuring the other sets.

4. A count indicating attachment for a counting scale having a counting beam, a counterpoise receiver and a counterbalancing poise thereon, and a threaded shaft for displacing the said receiver and poise relatively to the fulcrum of said beam, said attachment comprising in combination a rotary dial having count graduations thereon, and means comprising gearing for rotating the dial upon rotation of the threaded shaft.

5. A count indicating attachment for a counting scale having a counting beam, a counterpoise receiver and a counterbalancing poise thereon, and a threaded shaft for displacing the said receiver and poise relatively to the fulcrum of said beam, said attachment comprising in combination a rotary dial having count graduations thereon, means for rotating the dial upon rotation of the threaded shaft, said means comprising gearing and a coacting fixed rack carried by the counting beam whereby the dial is rotated in proportion to the rotational movement of the threaded shaft.

6. A count indicating attachment for a counting scale having a counting beam, a counterpoise receiver and a counterbalancing poise thereon, and a threaded shaft for displacing the said receiver and poise relatively to the fulcrum of said beam, said attachment comprising in combination a rotary dial having count graduations thereon, means for rotating said dial upon rotation of the threaded shaft, said means comprising a fixed rack carried by the counting beam, a pinion meshing therewith, a second pinion connected with the first pinion and a gear carried by the dial and meshing with the second pinion.

7. A count indicating attachment for a counting scale having a counting beam, a counterpoise receiver and a counterbalancing poise thereon, and a threaded shaft for displacing the said receiver and poise relatively to the fulcrum of said beam, said attachment comprising in combination a rotary dial having a plurality of rows of count graduations, means for rotating the dial upon and proportionally to rotation of the threaded shaft, said means comprising a fixed rack carried by the counting beam and a gear train coacting therewith and connected to the aforesaid dial, a fixed shield over the said dial, a window therein, a shutter rotatively adjustable with respect to the shield and dial, a plurality of staggered windows in said dial aligned with said respective rows of count graduations on the dial, and means for selectively bringing one of the staggered windows into juxtaposition to the window in the shield whereby a particular set of count graduations on the dial is exposed to view and the other sets are obscured from view.

8. A count indicating attachment for a counting scale having a counting beam, a counterpoise receiver and a counterbalancing poise thereon, and a threaded shaft for displacing the said receiver and poise relatively to the fulcrum of said beam, said attachment comprising in combination a rotary dial having a plurality of rows of count graduations corresponding to the counts for different numbers of articles in the receiver, gearing associated with the dial for rotating the dial upon rotation of the threaded shaft, a fixed shield over the said dial, a window therein, a shutter rotatively adjustable with respect to the shield and dial, a plurality of staggered windows in said dial aligned with said respective rows of count graduations on the dial, and means for selectively bringing one of the staggered windows into juxtaposition to the window in the shield whereby a particular set of count graduations on the dial is exposed to view and the other sets are obscured from view.

In testimony whereof I hereto affix my signature.

JOSEPH HOPKINSON.